United States Patent
Brooke et al.

(10) Patent No.: US 12,201,103 B1
(45) Date of Patent: Jan. 21, 2025

(54) WEARABLE FISHING POLE HOLDING DEVICE

(71) Applicants: James Daniel Brooke, Sanford, FL (US); Christopher Daniel Brooke, Sanford, FL (US)

(72) Inventors: James Daniel Brooke, Sanford, FL (US); Christopher Daniel Brooke, Sanford, FL (US)

( * ) Notice: Subject to any disclaimer, the term of this patent is extended or adjusted under 35 U.S.C. 154(b) by 0 days.

(21) Appl. No.: 18/238,125

(22) Filed: Aug. 25, 2023

(51) Int. Cl.
*A01K 97/10* (2006.01)
*F16M 13/04* (2006.01)

(52) U.S. Cl.
CPC ............ *A01K 97/10* (2013.01); *F16M 13/04* (2013.01)

(58) Field of Classification Search
CPC ...................................................... A01K 97/10
See application file for complete search history.

(56) References Cited

U.S. PATENT DOCUMENTS

| | | | |
|---|---|---|---|
| 2,499,117 A | 2/1950 | Smith | |
| 4,802,612 A * | 2/1989 | Anderson | F41C 33/001 224/625 |
| 5,520,312 A * | 5/1996 | Maddox | A01K 97/10 224/625 |
| 5,571,228 A * | 11/1996 | McMurtrie | A01K 97/10 224/268 |
| 6,003,746 A | 12/1999 | Richardson | |
| 6,237,821 B1 * | 5/2001 | Owen | A01K 97/10 D3/229 |
| 7,594,354 B1 * | 9/2009 | Chadwick | A01K 97/10 224/678 |
| 8,157,664 B2 | 4/2012 | Duncan | |
| 8,181,381 B1 * | 5/2012 | Kelleher | A01K 97/10 224/922 |
| 9,924,785 B1 * | 3/2018 | Gilmore | A45F 5/021 |
| D889,120 S | 7/2020 | Vandamia | |
| 10,945,473 B2 | 3/2021 | Kinsora | |
| 2023/0094262 A1 | 3/2023 | Ellwood | |

FOREIGN PATENT DOCUMENTS

| | | | | |
|---|---|---|---|---|
| GB | 2048633 A | * | 12/1980 | ............ A01K 97/10 |
| KR | 20180004441 A | * | 1/2018 | |
| WO | 2022045549 A1 | | 3/2022 | |

\* cited by examiner

*Primary Examiner* — Richard G Davis
(74) *Attorney, Agent, or Firm* — Jason T. Daniel, Esq.; Daniel Law Offices, P.A.

(57) ABSTRACT

A wearable fishing pole holding device includes an elongated tubular-shaped main body having a top end, a closed bottom end and a hollow interior. A neck strap extends outward from a top portion of the main body for positioning the main body against the chest of a user, and a belt loop extends outward from the bottom end of the main body for engaging the belt of a user. A malleable lip extends downward from the main body and is positionable between a users waist and belt. The belt loop and lip secure the bottom portion of the main body against the users waist. The main body includes an opening along the top end for receiving the bottom end of a fishing pole. Semi-circular indentations hold a reel secured to the fishing pole in place to permit one handed operation of the reel.

10 Claims, 3 Drawing Sheets

WEARABLE FISHING POLE HOLDING DEVICE

TECHNICAL FIELD

The present invention relates generally to the sport of fishing, and more particularly to a wearable device for holding a fishing pole while fishing.

BACKGROUND

The statements in this section merely provide background information related to the present disclosure and may not constitute prior art.

Recreational fishing is one of America's great pastimes that is often taught from one generation to the next. As is known, the sport of fishing requires a user to operate a fishing pole comprising an elongated rod with a fishing reel along one end. A fishing line extends from the reel through a series of guides that are positioned along the length of the rod and terminates at a baited hook or lure which is cast into the water. Upon engagement by a fish, a user manipulates the rod while using the reel to retract the hook and fish.

In this regard, the process of operating a fishing pole requires the fisherman to use both hands in order to simultaneously operate the rod and reel. Unfortunately, this requirement means that many disabled individuals are not able to fish due to the inability to use both of their arms and/or hands. As such, these individuals require assistance from others during the active phases of casting and catching the fish, which are the most enjoyable parts. In this regard, it is not uncommon for such individuals to shy away from the sport due to a feeling of embarrassment or ineptitude.

Accordingly, it would be beneficial to provide a wearable fishing pole holding device that can allow users without the use of both hands to fish, thereby alleviating the drawbacks noted above.

SUMMARY OF THE INVENTION

The present invention is directed to a wearable fishing pole holding device. One embodiment of the present invention can include an elongated tubular-shaped main body having a top end, a closed bottom end and a hollow interior. A neck strap can extend outward from the top portion of the main body for positioning the main body against the chest of a user. In one embodiment, a belt loop extends outward from the bottom end of the main body for engaging the belt of a user. A malleable lip extends downward from the main body and is positionable between a user's waist and belt. The belt loop and lip secure the bottom portion of the main body against the user's waist.

The main body includes an opening along the top end for receiving the bottom end of a fishing pole. When the pole is positioned within the main body, the neck of the reel is engaged by a semi-circular indentation to prevent movement of the same. When fishing, the pole remains within the main body, and a user can operate the reel using a single hand.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner. Several nonlimiting examples of connectors include, but are not limited to, thread-to-connect, twist-to-connect, and push-to-connect type devices, opposing strips of hook and loop material (e.g., Velcro®), attractively oriented magnetic elements or magnetic and metallic elements, buckles such as side release buckles, clamps, sockets, clips, carabiners, and compression fittings such as latches, hooks, snaps and buttons, for example. Each illustrated connector and complementary connector can be permanently secured to the illustrated portion of the device via a permanent sealer such as glue, or welds, for example.

Figure 1:
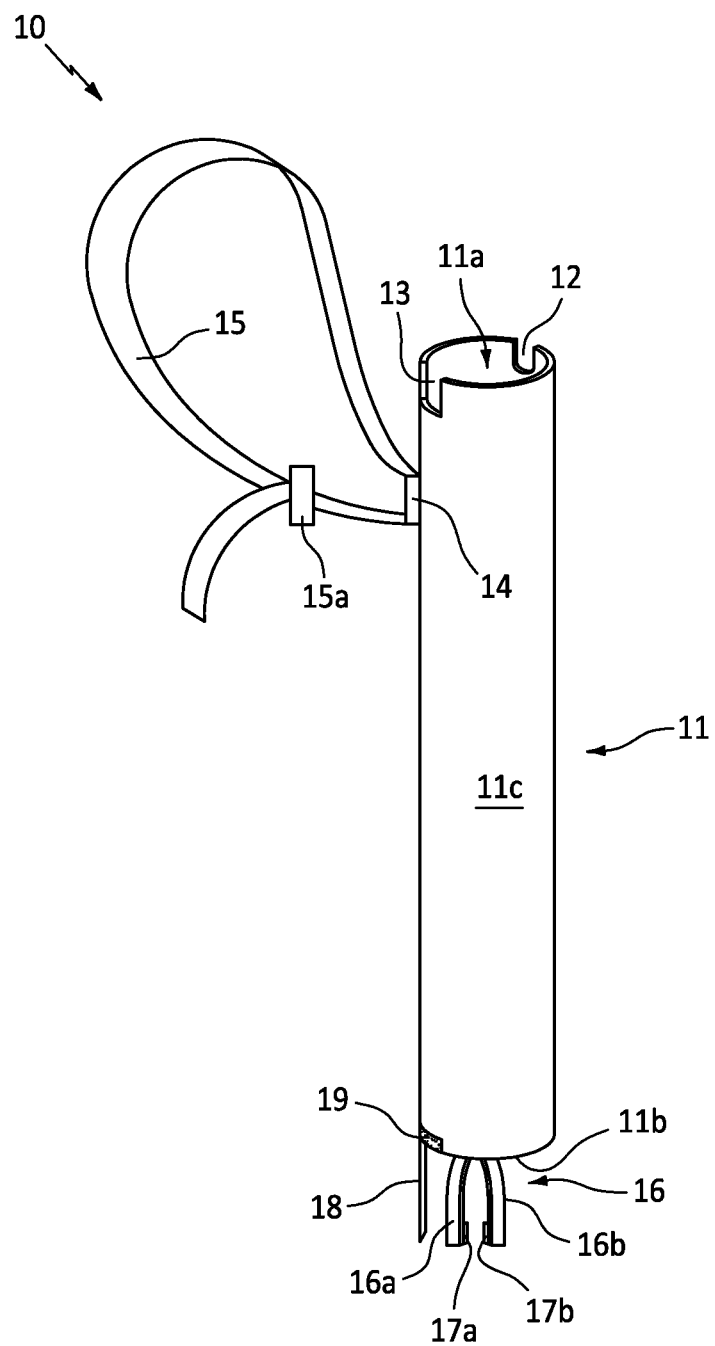
FIG. 1 is a perspective view of a wearable fishing pole holding device, in accordance with one embodiment of the invention.
Figure 2:
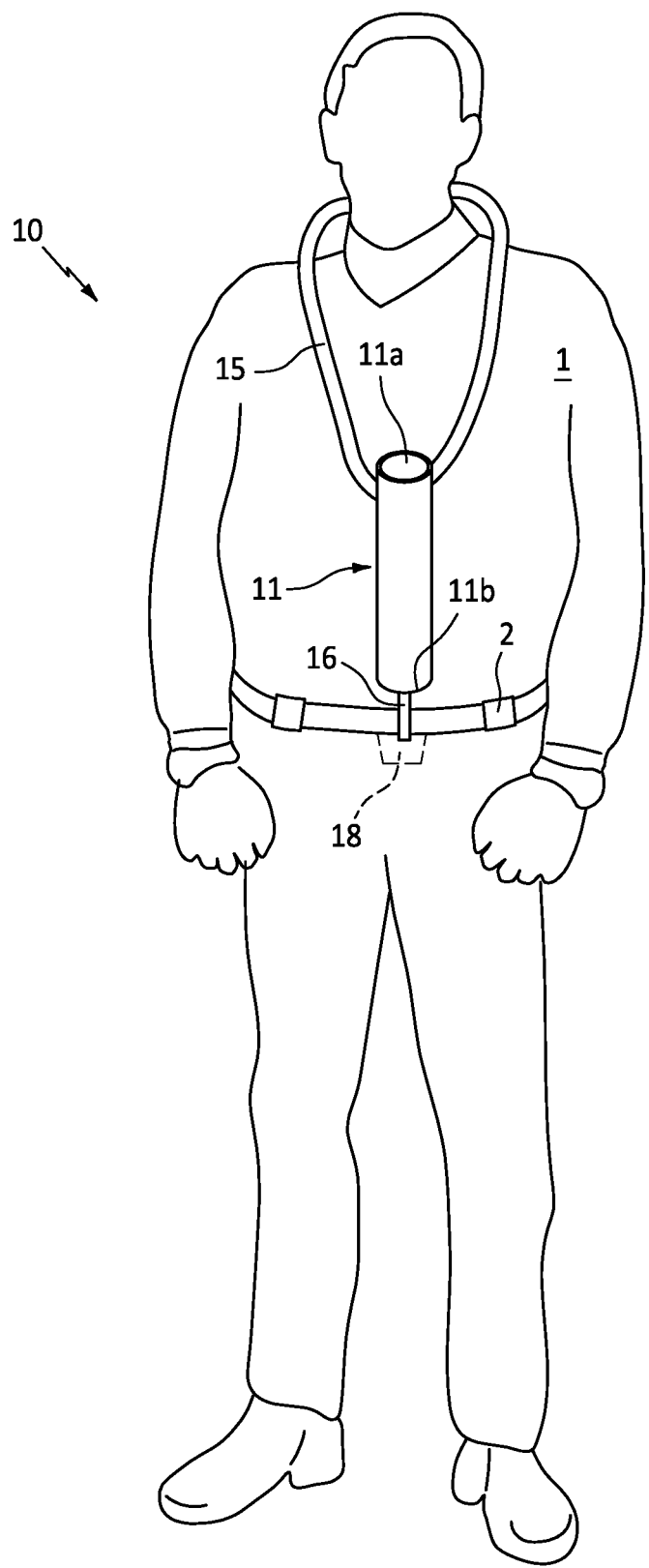
FIG. 2 is a front view of the perspective view of the wearable fishing pole holding device in operation, in accordance with one embodiment of the invention.
Figure 3:
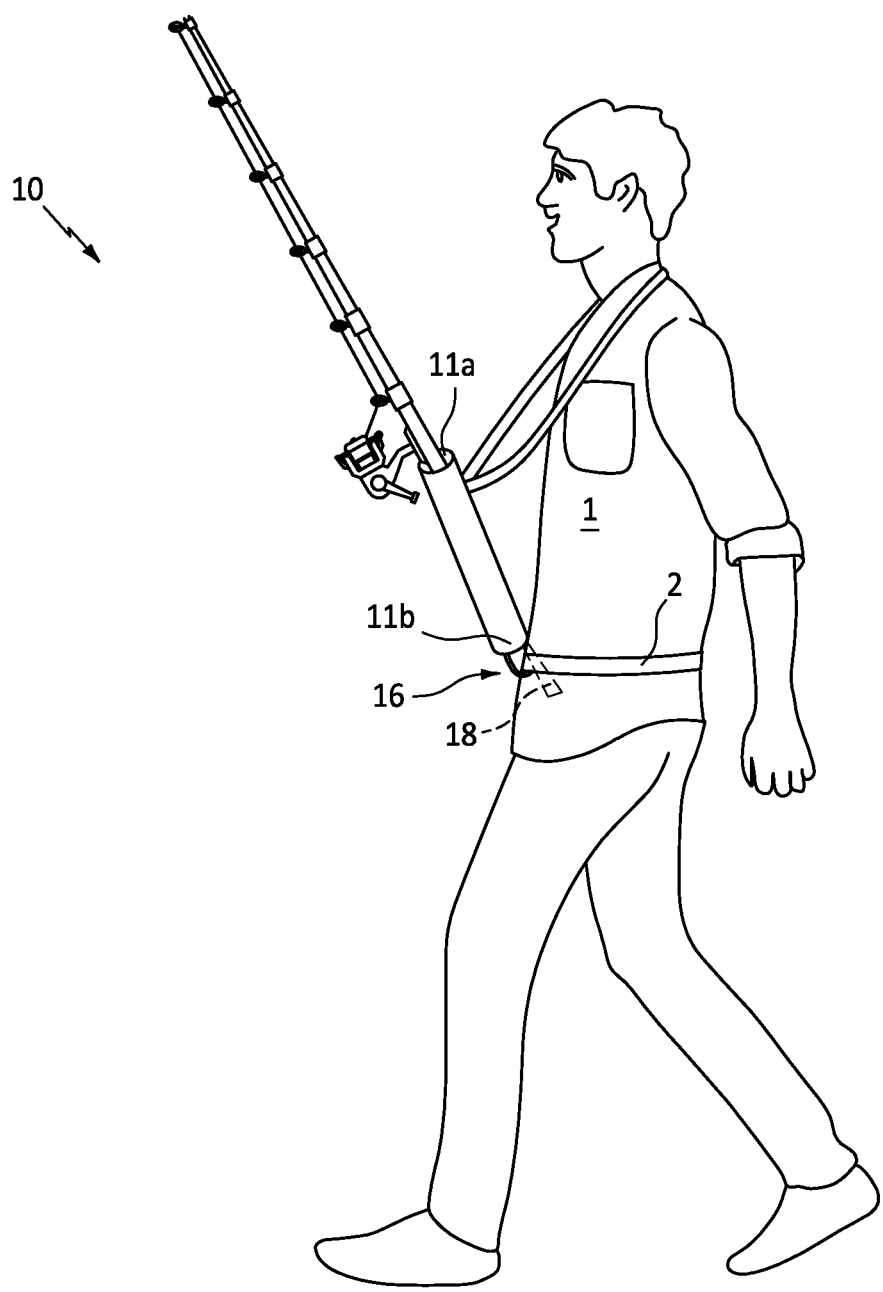
FIG. 3 is a side view of the perspective view of the wearable fishing pole holding device in operation, in accordance with one embodiment of the invention.

FIGS. 1-3 illustrate one embodiment of a wearable fishing pole holding device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown in the drawings, the device 10 can include an elongated, hollow, tubular-shaped main body 11 having an open top end 11a, a closed bottom end 11b, and a middle portion 11c that define a hollow interior space. In the preferred embodiment, two semi-circular indentations 12 and 13 can be positioned along the open top end 11a for receiving and engaging the neck of the reel and the finger notch of the pole, respectively.

As described herein, the main body 11 may be formed from any number of materials that are suitable for prolonged exposure to water, and that are relatively strong and stiff for their weight. Several nonlimiting examples include but are not limited to various metals or metal alloys, various plastics or polymers, various composite materials, and/or various natural materials such as wood, for example.

Although described above with regard to a particular shape or size, this is for illustrative purposes only, as the main body can include any number of different shapes, sizes and/or construction materials suitable for performing the functionality described herein.

In one embodiment, an elongated neck strap 15 can extend outward from the main body at a location that is adjacent to the top end 11a. The neck strap can be constructed from any number of suitable materials such as leather or nylon, for example, and can function to engage the neck of a user so as to position the main body 11 adjacent to the user's torso. In the preferred embodiment, the neck strap can include a length adjustment mechanism 15a such as a slide adjustor, for example, and can be removably connected to the main body via a connector 14 such as a ring or clasp, for example.

Of course, other embodiments are contemplated wherein the strap is permanently connected to the main body, is constructed from different materials and/or is positioned at a different location along the main body.

Although described with regard to a neck strap for suspending the device from the neck of a user, other embodiments are contemplated. For example, one embodiment contemplates a vest or shoulder harness which can be used in conjunction with, or instead of the neck strap for permitting the main body to be suspended from different portions of the user's torso. In either instance, any number of cushions or padded sleeves may be provided along the strap(s) to increase the comfort of the user while utilizing the device.

In one embodiment, a belt loop 16 can extend outward from the bottom end of the main body 11b. In the preferred embodiment, the belt loop can include two malleable and flexible loop members 16a and 16b each having hook a connector 17a and 17b such as hook and loop material, along the distal ends. As will be described below, the belt loop members can be positioned about the belt of a user to secure the bottom end of the main body against the user's waist. Of course, any number of other components capable of engaging a user's belt and securing the device thereto are also contemplated.

In one embodiment, a lip 18 can extend downward from the bottom end of the main body at a location directly beneath the neck strap 15. The lip 18 can be constructed from a thin (e.g., 2 mm-5 mm) piece of resilient and malleable material such as plastic, for example, and can function to be positionable between the waist and belt of a user. The waist lip can be used instead of, or in conjunction with the belt loop to securely position the bottom of the main body against the user's waist area in a manner so as to prevent lateral movement during device operation.

In one embodiment, the lip 18 can be removably connected to the main body via another connector 19 such as hook and loop material, for example, however other embodiments are contemplated wherein the lip is permanently connected to the main body. In either instance, the inclusion of the malleable lip is important, as it allows the user to bend and walk normally while fishing without the lip pushing, cutting, or otherwise causing discomfort to the user.

FIGS. 2 and 3 illustrate one embodiment of the device 10 in operation. As shown, a user 1 can position their neck through the neck strap 15 to position the main body 11 against their torso. Next, the user can position the malleable lip behind their belt and/or secure the belt loop 16 about their belt 2. When so positioned, the device will be secured onto the user in a hands-free capacity.

Next, the user can cast their fishing line into the water and position the bottom end of their fishing pole 3 through the open top end of the main body 11a. When positioned, the rod and reel will be securely held by the device 10. When a fish engages the hook, the user can use one hand to reel the line while the main body holds the fishing pole firmly in place.

Accordingly, the above-described device provides a novel solution for enabling individuals to fish with a single hand that is not rendered obvious by any known art.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A wearable fishing pole holding device, comprising:
a main body that includes an elongated tubular member having a top end, a closed bottom end, a hollow interior space, and an opening that is configured to receive a bottom portion of a fishing pole;
a belt loop that extends outward from the bottom end of the main body; and
a strap that is secured along the main body, said strap being configured to secure the main body onto a user, wherein the main body is configured to receive the fishing pole without interfering with an operation of a fishing reel secured to the fishing pole.

2. The device of claim 1, wherein the strap comprises a neck strap for engaging a neck of the user to position the main body adjacent to a chest of the user.

3. The device of claim 2, further comprising:
a length adjustment mechanism that is positioned along the strap, said mechanism functioning to adjust an orientation of the main body against the chest of the user.

4. The device of claim 1, wherein the opening is positioned along the top end of the main body.

5. The device of claim 1, wherein the belt loop includes functionality for removably engaging a belt of the user wearing the device.

6. The device of claim 1, wherein the belt loop includes two flexible loop members each having a connector along a distal end.

7. The device of claim 1, further comprising:
an elongated lip that extends from the bottom end of the main body.

8. The device of claim 7, wherein the lip is malleable.

9. The device of claim 7, wherein the lip is removably connected to the main body.

10. The device of claim 1, wherein the strap is removably connected to the main body.

* * * * *